United States Patent Office 2,800,472
Patented July 23, 1957

2,800,472

PRODUCTION OF ANTHRACENE DERIVATIVES

Heinz-Werner Schwechten and Otto Bayer, Leverkusen-Bayerwerk, Germany, assignors to Farbenfabriken Bayer Aktiengesellschaft, Leverkusen, Germany, a corporation of Germany No Drawing. Application July 15, 1952,
Serial No. 298,996

Claims priority, application Germany July 19, 1951

4 Claims. (Cl. 260—243)

The present invention relates to a process of producing anthracene derivatives.

Beilstein XIV, first supplement, page 462, describes a reaction product of $SO_3$ and 1.4-diamino-anthraquinone, which has the alleged formula

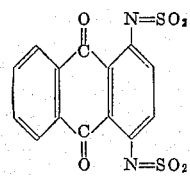

We have found that the above compound shows a strongly unsaturated nature and substantially behaves like benzoquinone or α-naphthoquinone. Therefore the compound very probably has the formula

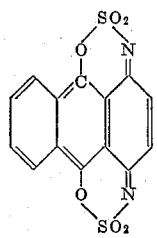

and represents a derivative of 1.4-anthraquinone. The compound as such is capable of forming, similar to α-naphthoquinone, the most various addition compounds for instance with hydrogen, alkali metal bisulfites, alkali metal cyanides, primary and secondary amines, mercaptans and dienes. In the addition reaction derivatives of 1.4-diamino-anthracene of the formula

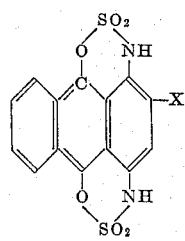

are obtained wherein X stands for hydrogen, $SO_3H$, CN, NH alkyl, NH aryl, S alkyl or S aryl; with diene addition products according to the diene-synthesis are obtained. 1.4-diamino-anthraquinone may be replaced by its nuclear substitution products. In this case the 2- and 3-position must not carry substituents at the same time. Examples of substituents are halogen, alkyl groups and carboxylic groups. The reaction is carried out at temperatures up to 200° C. As solvent water or an inert organic solvent are preferably used.

When saponified by oxidation, for instance with concentrated sulfuric acid in the heat, the above compounds give rise to the corresponding substituted 1.4-diamino-anthraquinones, for instance 1.4-diamino-anthraquinone-2-carbonamide is obtained from the above compound with X=CN with simultaneous hydration of the CN group.

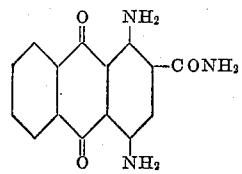

In this way it is possible to produce a large number of derivatives of 1.4-diamino-anthraquinone substituted in 2-position, which are of importance in dyestuff chemistry.

The invention is further illustrated by the following examples without being restricted thereto:

Example 1

10 grams of the product obtained by reacting fuming sulfuric acid upon 1.4-diamino-anthraquinone are suspended in 250 cc. of glacial acetic acid and gradually reacted with 10 grams of zinc dust at room temperature, reduction occurring with slight increase in temperature. After the orange-red colored starting material has been converted into the greenish-yellow reduction product, the mixture is diluted with water and filtered off. The filtered product is dissolved in dilute sodium hydroxide solution to form a brown-yellow solution which is filtered and acidified with dilute hydrochloric acid. The precipitated, finely crystalline reduction product is filtered off, washed with water and dried. By recrystallizing from glacial acetic acid in which it dissolves with yellow coloration and green fluorescence the product is obtained in the form of green-yellow needles. According to analysis the product shows the formula

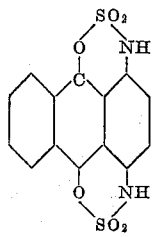

Example 2

10 grams of the product obtained by reacting fuming sulfuric acid upon 1.4-diamino-anthraquinone are heated with 100 cc. of sodium bisulfite solution on the water bath. The orange-red colored starting material is transformed into a crystalline paste of a yellow-brown sodium salt which is filtered off after cooling and washed with a sodium hydroxide solution. It dissolves in water with yellow-brown coloration; by acidifying a greenish-yellow acid is obtained which yields a dark-red colored sulfonic acid by oxidation with a bichromate solution.

Example 3

10 grams of the product obtained by reacting fuming sulfuric acid upon 1.4-diamino-anthraquinone are heated with 10 grams of potassium cyanide and 40 cc. of water to 30–40° C. on the water bath, whereby an exothermic reaction occurs. After dissolution of the reactants an orange colored potassium salt crystallizes which is filtered off immediately after cooling and washed with a sodium hydroxide solution. By recrystallizing from four times the quantity of saturated sodium hydroxide solution a salt crystallizing in long yellow-brown needles is obtained. The reaction product easily dissolves in water with a yellow-brown coloration.

Acetic acid precipitates from the solution a dark yellow colored salt which is transformed into the yellow free acid by addition of dilute hydrochloric acid. The free acid dissolves in glacial acetic acid with green fluorescence and can be recrystallized from nitrobenzene. According to analysis the compound shows the formula

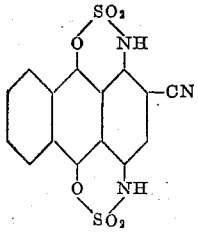

By oxidizing the acetic acid solution of the above substance with a solution of sodium bichromate in glacial acetic acid brown-red crystals percipitate which dissolve in concentrated sulfuric acid with a violet coloration. By heating the sulfuric acid solution to 90° C. saponification gradually takes place which leads to a blue product, presumably 1.4-diamino-anthraquinone-2-carbonamide, with simultaneous oxidation.

*Example 4*

20 grams of the product obtained by reacting fuming sulfuric acid upon 1.4-diamino-anthraquinone are placed in an autoclave with 200 cc. of chlorobenzene, 20 cc. of butadiene are added and the mixture is heated first to 80–90° C. for some hours, thereafter to 150° C. After cooling the content of the autoclave is filtered off and the residue dried. The product thus obtained is crystallized but not pure. By concentrating to a small volume the filtrate of chlorobenzene yields yellow-brown crystals which are filtered off, washed with methanol and dried. The product can be recrystallized from nitrobenzene in which it is soluble with a brownish-yellow coloration. It dissolves in concentrated sulfuric acid with an orange-red coloration and orange-red fluorescence, in an aqueous solution of pyridine with a red-violet coloration and yields a dark green colored vat. According to analysis the product has the formula

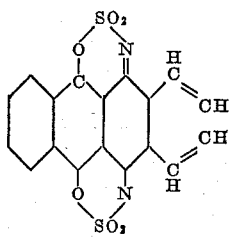

Accordingly, the substance is believed to be formed by dehydrogenation of the primary addition product and represents a derivative of naphthacene quinone which belief is supported by the behavior of the substance.

We claim:

1. The process for the production of 1,4-diamino- anthracene derivatives which comprises reacting at temperatures up to about 100° C.

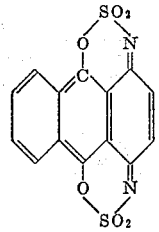

with a compound selected from the group consisting of alkali-metal bisulfites, alkali-metal cyanide and hydrogen.

2. The process for the production of a 1,4-diamino-anthracene derivative which comprises reacting at temperatures up to about 100° C.

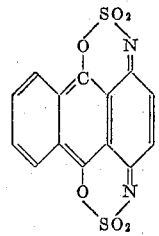

with an aqueous solution of an alkali-metal bisulfite.

3. The process for the production of a 1,4-diamino-anthracene derivative which comprises reacting at temperatures up to about 100° C.

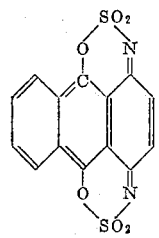

with hydrogen.

4. The process for the production of a 1,4-diamino-anthracene derivative which comprises reacting at temperatures up to about 100° C.

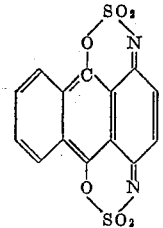

with an aqueous solution of an alkali metal cyanide.

References Cited in the file of this patent
UNITED STATES PATENTS
1,871,466   Peter _____ Aug. 16, 1932